US011682004B2

(12) United States Patent
Chen et al.

(10) Patent No.: US 11,682,004 B2
(45) Date of Patent: Jun. 20, 2023

(54) METHODS, SYSTEMS, APPARATUSES AND DEVICES FOR FACILITATING PROCESSING OF RECYCLABLE ITEMS

(71) Applicant: RecycleGO Inc, Irvington, NJ (US)

(72) Inventors: Stanley Chen, New York City, NY (US); Jan-Robin Gerards, New York City, NY (US)

(73) Assignee: RecycleGO Inc, Irvington, NJ (US)

( * ) Notice: Subject to any disclaimer, the term of this patent is extended or adjusted under 35 U.S.C. 154(b) by 0 days.

(21) Appl. No.: 17/862,417

(22) Filed: Jul. 12, 2022

(65) Prior Publication Data
US 2022/0358492 A1 Nov. 10, 2022

Related U.S. Application Data

(63) Continuation of application No. 16/422,229, filed on May 24, 2019, now Pat. No. 11,403,626.

(51) Int. Cl.
*G06Q 20/36* (2012.01)
*G06Q 10/30* (2023.01)
*H04L 9/32* (2006.01)

(52) U.S. Cl.
CPC ......... *G06Q 20/3678* (2013.01); *G06Q 10/30* (2013.01); *H04L 9/3213* (2013.01); *G06Q 2220/00* (2013.01)

(58) Field of Classification Search
None
See application file for complete search history.

(56) References Cited

U.S. PATENT DOCUMENTS

2017/0178125 A1* 6/2017 Jiménez ................. G06Q 10/30
2019/0304236 A1* 10/2019 Chan ................... B29B 17/0026

* cited by examiner

*Primary Examiner* — John W Hayes
*Assistant Examiner* — Ari Shahabi
(74) *Attorney, Agent, or Firm* — Dhiraj Jindal; Patent Yogi LLC

(57) ABSTRACT

A system to facilitate processing of recyclable items is disclosed. Further, the system may include a communication device configured for receiving event data associated with a recycling process from at least one sensory device, receiving a request for the event data from a first user device, and transmitting the event data to the first user device. Further, the system may include a processing device communicatively coupled to the communication device, configured for issuing a predetermined amount of crypto tokens to a second crypto account. Further, the system may include a storage device communicatively coupled to the processing device, configured for storing, using a distributed ledger technology, the event data, and data related to the issuing of the predetermined amount of crypto tokens to the second crypto account.

12 Claims, 13 Drawing Sheets

METHODS, SYSTEMS, APPARATUSES AND DEVICES FOR FACILITATING PROCESSING OF RECYCLABLE ITEMS

RELATED APPLICATIONS

This is a continuation application of U.S. patent application Ser. No. 16/422,229 which was filed on May 24, 2019, entitled "METHODS, SYSTEMS, APPARATUSES AND DEVICES FOR FACILITATING PROCESSING OF RECYCLABLE ITEMS".

TECHNICAL FIELD

Generally, the present disclosure relates to the field of data processing. More specifically, the present disclosure relates to methods, systems, apparatuses and devices for facilitating processing of recyclable items.

BACKGROUND

Recycling is an effective action to restrict greenhouse gas emissions by removing the requirement to bury or incinerate waste. This leads to a reduction in nitrous oxide and carbon dioxide emissions. Additionally, recycling avoids energy-intensive manufacturing steps including processing of raw material and allowing processing of material for less energy.

However, systems that allow maintaining of a transparent ledger of accounting for recycling activity, utilizing sensors to gauge quality and quantity of recycled goods, and aligning objectives of stakeholders like governments, hauling companies, Material Recovery Facilities, businesses, and individuals involved in the recycling process do not exist.

Further, systems that allow selling of recycling of stored recycling data in lieu of cryptocurrency tokens do not exist.

Therefore, there is a need for improved methods, systems, apparatuses and devices for facilitating processing of recyclable items that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a system to facilitate processing of recyclable items. Further, the system may include a communication device. Further, the communication device may be configured for receiving event data associated with a recycling process from one or more sensory devices. Further, the one or more sensory devices may be configured for capturing the event data associated with the recycling process. Further, the one or more sensory devices may include a hyperspectral camera. Further, the hyperspectral camera may be configured for capturing one or more hyperspectral images of one or more recyclable items undergoing the recycling process. Further, the event data may include the one or more hyperspectral images. Further, the communication device may be configured for receiving a request for the event data from a first user device. Further, the communication device may be configured for transmitting the event data to the first user device. Further, the system may include a processing device communicatively coupled to the communication device. Further, the processing device may be configured for analyzing the event data using one or more image processing models. Further, the processing device may be configured for determining one or more of an amount and a type of the one or more recyclable items based on the analyzing. Further, the processing device may be configured for issuing a predetermined amount of crypto tokens corresponding to one or more of the amount and the type of the one or more recyclable items to a second crypto account associated with a second user device. Further, the system may include a storage device communicatively coupled to the processing device. Further, the storage device may be configured for storing, using a distributed ledger, the event data, and data related to the issuing of the predetermined amount of crypto tokens to the second crypto account.

The present disclosure provides a method to facilitate processing of recyclable items may be disclosed. Further, the method may include receiving, using a communication device, event data associated with a recycling process from one or more sensory devices. Further, the one or more sensory devices may be configured for capturing the event data associated with the recycling process. Further, the one or more sensory devices may include a hyperspectral camera. Further, the hyperspectral camera may be configured for capturing one or more hyperspectral images of one or more recyclable items undergoing the recycling process. Further, the event data may include the one or more hyperspectral images. Further, the method may include storing, using a storage device, using a distributed ledger, the event data. Further, the method may include analyzing, using a processing device, the event data using one or more image processing models. Further, the method may include determining, using the processing device, one or more of an amount and a type of the one or more recyclable items based on the analyzing. Further, the method may include issuing, using the processing device, a predetermined amount of crypto tokens corresponding to one or more of the amount and the type of the one or more recyclable items to a second crypto account associated with a second user device. Further, the method may include transmitting, using the communication device, the event data to the first user device. Further, the method may include storing, using the storage device, using the distributed ledger, data related to the issuing of the predetermined amount of crypto tokens to the second crypto account.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
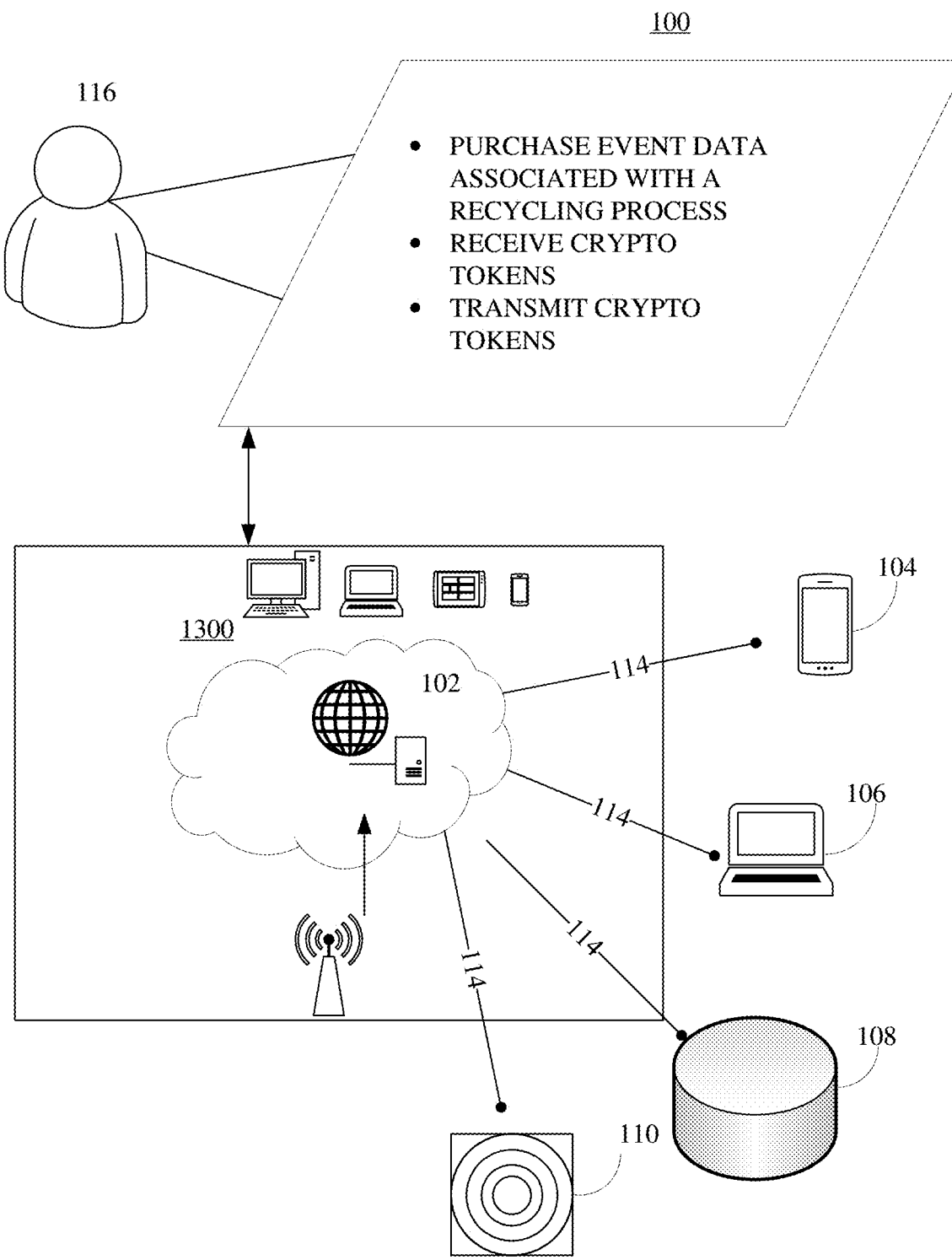
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of processing of recyclable items, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part.

Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

FIG. 1 is an illustration of an online platform 100 consistent with various embodiments of the present disclosure. By way of non-limiting example, the online platform 100 to facilitate processing of recyclable items may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, and sensors 110 over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the online platform 100.

A user 116, such as the one or more relevant parties, may access online platform 100 through a web based software application or browser. The web based software application may be embodied as, for example, but not be limited to, a website, a web application, a desktop application, and a mobile application compatible with a computing device 1300.

Figure 2:
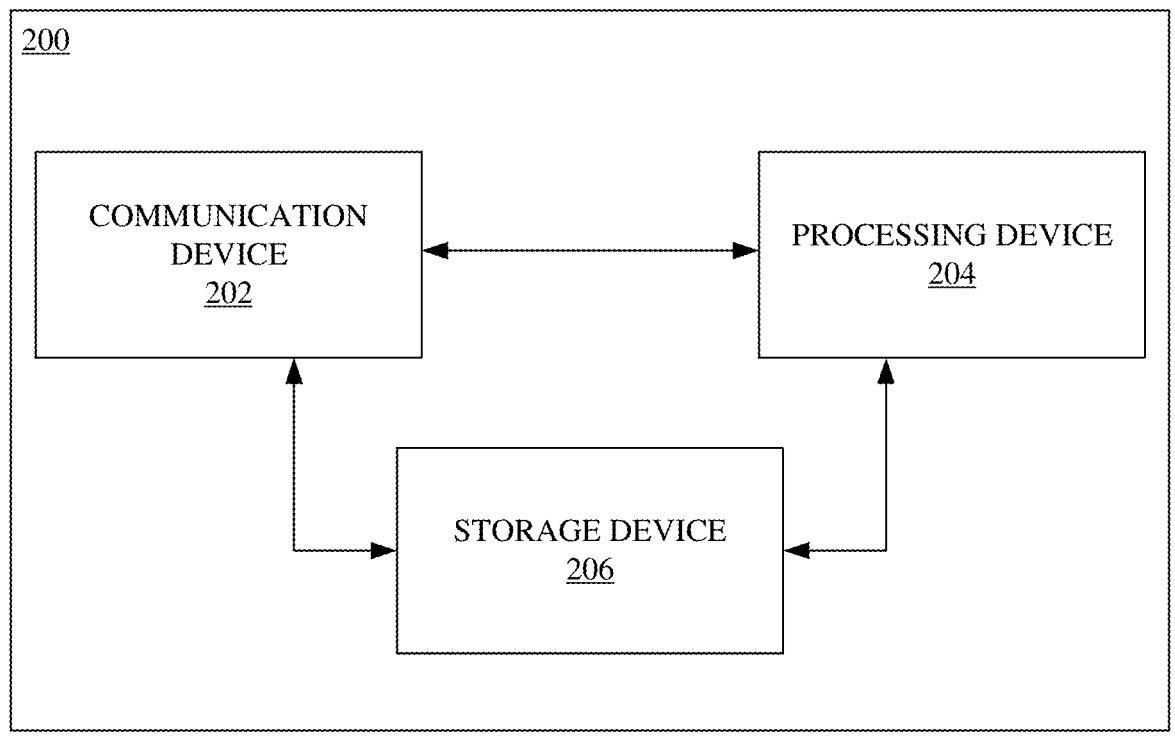
FIG. 2 is a block diagram of a system to facilitate processing of recyclable items, in accordance with some embodiments.

FIG. 2 is a block diagram of a system 200 to facilitate processing of recyclable items, in accordance with some embodiments. Further, the system 200 may include a communication device 202 configured for receiving event data associated with a recycling process from at least one sensory device. Further, the event data may include data describing the recycling process. For instance, the event data may include a description of a recyclable item that may have been recycled during the recycling process. For instance, the recyclable item may include paper based products, such as used notebooks, newspapers, cardboard boxes, plastic based products such as plastic bottles, carry bags, glass based products, including windows, and bottles, metal based products, including ferrous, and non-ferrous metal based products, a combination therein, brand or product labels, and so on. Further, the event data may include an amount of the recyclable item that may have been recycled. Further, the event data may include a quality of the recyclable item. Further, the quality of the recyclable item may describe an amount of the recyclable item that may not contain contaminants and may be recyclable. For instance, if the recyclable item includes paper based products, the quality of the recyclable item may correlate to an amount of ink on the recyclable item. Further, the event data may include a description of one or more recycling processes to recycle the recyclable item. For instance, the one or more recycling processes may include sorting the recyclable item, including separating plastic based products, paper based products, and metal based products from the recyclable item, rinsing, including cleaning the recyclable item to rid contaminants, colorants or additives. Further, the one or more recycling processes may include reclamation of the recyclable item. For instance, if the recyclable item includes plastic based products, reclamation may include feeding plastic into grinders to be flaked and cleaned, and melting flakes of plastics into corresponding individual polymers and re-formed into pellets, or chemically recycled through processes such as depolymerization, decomposition or conversion and re-formed into chemical components, monomers or petroleum products. Further, if the recyclable item includes glass based products, reclamation may include crushing the glass into small pieces (cullet). Further, the cullet may be shipped blended with virgin material, or placed in a furnace and melted to be converted directly into new glass containers. Further, if the recyclable item includes metal based products, reclamation may include smelting the metals at high temperatures, such as 2,800 degrees Fahrenheit. Further, the molten metal liquid may be recast into ingots. Further, the event data may include the timestamp describing temporal details of the occurrence of the event, such as time, date, and year at which the event data was recorded. Further, the event data may be received from the at least one sensory device. Further, the at least one sensory device may be configured to capture the event data associated with the recycling process. For instance, the at least one sensory device may include a spectroscopic scanner used during sorting configured to differentiate between different types of material, such as but not limited to different types of paper based products and plastic based products. Further, the at least one sensory device may include a colored filter scanner configured to scan, and aid in sorting of glass based products. Further, the communication device 202 may be configured for receiving a request for the event data from a first user device. Further, the first user device may include, but may not be limited to a smartphone such as the mobile device 104, a tablet computer, other electronic devices 106, such as a laptop computer and a desktop computer, a wearable device such as a smart watch, and so on. Further, the first user device may correspond to a first user, such as at least one of a government agency, an NGO, a non-profit organization, a corporate organization, and an individual. Further, the first user may request for the event data associated with the recycling process to evaluate and compare a recycling performance and/or practice of one or more recyclers, as to draw larger conclusions about waste and/or materials management trends associated with the recycling process. Further, the communication device 202 may be configured for transmitting the event data to the first user device based on deducting of a predetermined amount of crypto tokens from a first crypto account associated with the first user. Further, the amount of crypto tokens may be predetermined based on a value of the event data. For instance, the value of the event data may be determined based on an amount of recyclable items recycled. Further, the system 200 may include a processing device 204 communicatively coupled to the communication device 202. Further, the processing device 204 may be configured for deducting the predetermined amount of crypto tokens from the first crypto account. Further, the crypto account may include at least one of a digital wallet associated with the user of the user device and a hardware wallet associated with the user of the user device. Further, in an instance, the processing device 204 may be configured for recording transaction data associated with the deducting the predetermined amount of crypto tokens from the first crypto account. For instance, the transaction data may include at least one of a time of deducting the predetermined amount of crypto tokens, a digital address of the first crypto account, and the predetermined amount and a value of the crypto tokens deducted from the first crypto account. Further, the system 200 may include a storage device 206 communicatively coupled to each of the communication device 202 and the processing device 204. Further, the storage device 206 may be configured for storing, using a distributed ledger technology, the event data, and data related to the deducting of the predetermined amount of crypto tokens from the first crypto account. Further, the distributed ledger technology may include at least one of a block-chain, and a hashgraph. For instance, the storage device 206 may be configured for storing the transaction data associated with the deducting of the predetermined amount of crypto tokens from the first crypto account. For instance, the transaction data may include at least one of a time of deducting the predetermined amount of crypto tokens, a digital address of the first crypto account, and the predetermined amount and a value of the crypto tokens deducted from the first crypto account. Further, in some embodiments, the at least one sensory device may include a visual classification system configured to capture an image of a recyclable item, wherein the at least one of an amount and a type of recyclable item may be determinable based on analysis of the image. Further, in an instance, the visual classification system may a hyperspectral camera configured to capture a hyperspectral image of the recyclable item. Further, the visual classification system may include an AI camera, an X ray, a high speed camera, and so on.

Further, in an instance, physical or chemical characteristics of the recyclable item may be determinable based on analysis of the image. Further, in some embodiments, the at least one sensory device may be located at a Materials Recovery Facility (MRF). For instance, the visual classification system located at the Material Recovery Facility (MRF) may be configured to capture a type of the recyclable item. For instance, the recyclable item may include paper based products, such as used notebooks, newspapers, cardboard boxes, plastic based products such as plastic bottles, carry bags, glass based products, including windows, and bottles, metal based products, including ferrous, and non-ferrous metal based products, a combination therein, brand or product labels, and so on. Further, the visual classification system located at the Material Recovery Facility (MRF) may be configured to capture an amount of the recyclable item that may have been recycled. Further, the visual classification system located at the Material Recovery Facility (MRF) may be configured to capture a quality of the recyclable item. Further, the quality of the recyclable item may describe the physical or chemical condition of a recyclable item, such as an amount of the recyclable item that may not contain contaminants, and may be recyclable. For instance, if the recyclable item includes paper based products, the quality of the recyclable item may correlate to an amount of ink on the recyclable item. Further, if the recyclable item includes plastic based food containers or has encountered other items that came into contact with food, the quality of the recyclable item may correlate to an amount of food remains on the recyclable item.

Further, in some embodiments, the at least one sensory device may include a tag reader configured to read at least one tag associated with a container configured to receive and store a recyclable item. For instance, the at least one tag associated with the container may include a location tag, such as a GPS sensor, GLONASS sensor, a Bluetooth beacon, and ultra-wideband sensors, configured to be read by the at least one of the at least one sensory device and the first user device. Further, the at least one tag associated with the container may include a QR tag, an NFC tag, an RFID tag, a Numeric tag, a Magnetic tag, an image, and so on, associated with a container of the recyclable item, as captured by a tag reader.

Further, in some embodiments, the event data may include at least one of an amount and a type of recyclable item, an amount of non-recyclable item, data related to at least one recycling procedure in the recycling process, and an amount and a type of recycled item.

Further, in some embodiments, the processing device 204 may be configured for issuing a predetermined amount of crypto tokens to a second crypto account associated with a second user device corresponding to the recycling process based on the event data. Further, the second user device may be associated with a second user. Further, the second user may include an individual, a corporation, a manufacturing facility, or a government agency associated with the recycling process of the recyclable item, such as that which occurs at an MRF. Further, the amount of crypto tokens may be predetermined based on a value of the recyclable item, such as determined by an amount of the recyclable item, and a type of the recyclable item. For instance, the predetermined amount of crypto tokens may be more if the recyclable item includes a plastic based product, and may be less of the recyclable item includes a paper based product.

Further, in some embodiments, the communication device 202 may be configured for receiving a proof of provenance data from the at least one sensory device. Further, the at least one sensory device may be configured for calculating the proof of provenance data based on the event data. Further, the proof of provenance data may include an origin and ownership data. Further, the at least one sensory device may calculate the proof of provenance data by analyzing the event data. For instance, the event data may include sensory data captured from at least one tag, such as a QR tag, an NFC tag, an RFID tag, a Numeric tag, a Magnetic tag, and so on, associated with a container of the recyclable item, as captured by a tag reader. Further, the tag reader may be configured to determine the proof provenance data based on the sensory data captured from the at least one tag. For instance, the sensory data captured by the tag reader may include an origin data describing a source of the recyclable item, and an ownership data describing an owner of the recyclable item, such as a corporation, an individual, a government agency, and so on. Further, the proof of provenance data may include a recycling data corresponding to at least one of a quality of a recyclable item associated with the recycling process, a quantity of the recyclable item, and a quantity of non-recyclable items associated with the recycling process. Further, the at least one sensory device may calculate the proof of provenance data by analyzing the event data. For instance, if the event data comprises one or more images captured by a visual classification system, the visual classification system may be configured to analyze the one or more images, such as through image processing, to determine a quantity of the recyclable item. Further, in an instance, the analyzing may include determining a quantity of the recyclable item, such as determining that the recycling process may correspond to 5 tons of the recyclable item. Further, the at least one sensory device may be configured for determining a quality of the recyclable item. Further, the quality of the recyclable item may be calculated by comparing the quantity of the recyclable item against an amount of contaminants in the recyclable item. For instance, the quantity of the recyclable item may be compared against the quantity of contaminants to determine the quality of the recyclable item. Further, the proof of provenance data may comprise an amount of discarded non-recyclable item. Further, the discarded non-recyclable item may have been sorted from the recyclable item during the recycling process. Further, in an instance, a quantity of the discarded non-recyclable item may be compared against the quantity of the recyclable item to determine the quality of the recyclable item. Further, the storage device 206 may be configured for storing, using the distributed ledger technology, the proof of provenance data. Further, the communication device 202 may be configured for transmitting the proof of provenance data to the first user device.

Further, in some embodiments, the processing device 204 may be configured for issuing a predetermined amount of crypto tokens to a second crypto account associated with a second user device associated with the recycling process based on the proof of provenance data. Further, the amount of crypto tokens may be predetermined based on the proof of provenance data. For instance, the predetermined amount of crypto-tokens may correspond to at least one of a quality of a recyclable item associated with the recycling process, a quantity of the recyclable item, and a quantity of non-recyclable items associated with the recycling process. Further, the storage device 206 may be configured for storing, using the distributed ledger technology, data related to the issuing the predetermined amount of crypto tokens to the second crypto account, such as but not limited to a time of issuance of the predetermined amount of crypto-tokens, and the amount of issued crypto-tokens.

Further, in some embodiments, the communication device 202 may be configured for receiving a proof of impact data from the at least one sensory device. Further, at least one sensory device may be configured for calculating the proof of impact data based on the event data. Further, the proof of impact data may include recycling data corresponding to at least one of a raw material reduction and $CO_2$ offset. Further, the communication device 202 may be configured for transmitting the proof of impact data to the first user device. Further, the at least one sensory device may be configured to analyze the event data to calculate the proof of impact data. For instance, if the event data includes one or more images captured by a visual classification system, the visual classification system may be configured for analyzing the one or more images, such as through image processing, and determine an amount of the recyclable item. For instance, if recyclable item comprises plastic based food packaging products, the at least one sensory device may be configured to determine an amount of recyclable item not containing food particles, such as food scraps. Further, the amount of recyclable item not containing food particles may correspond to raw material reduction. Further, the at least one sensory device may be configured to analyze the event data to determine a composition of the recyclable item to calculate a carbon offset after recycling the recyclable item. For instance, recycling plastic based products, such as Polyethylene terephthalate (PET) bottles may lead to a higher carbon ($CO_2$) offset than recycling paper based products. Further, the storage device 206 may be further configured for storing, using the distributed ledger technology, the proof of impact data.

Further, in some embodiments, the processing device 204 may be configured for issuing a predetermined amount of crypto tokens to a second crypto account associated with a second user device associated with the recycling process based on the proof of impact data. Further, the amount of crypto tokens may be predetermined based on the proof of impact data. For instance, the predetermined amount of crypto-tokens may correspond to at least one of raw material reduction, and $CO_2$ offset. Further, the storage device 206 may be configured for storing, using the distributed ledger technology, data related to the issuing the predetermined amount of crypto tokens to the second crypto account.

Further, in some embodiments, the processing device 204 may be configured for generating an anonymized event data based on anonymization of the event data. Further, the communication device 202 may be configured for transmitting the anonymized event data to the first user device.

Figure 3:
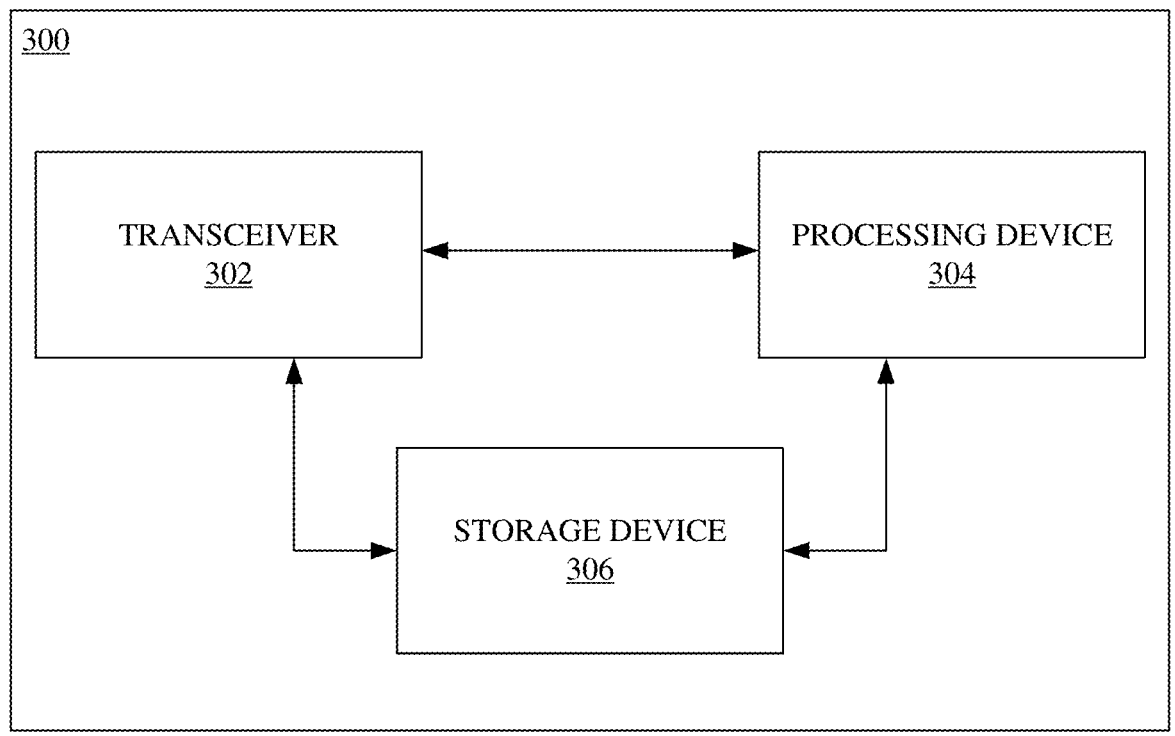
FIG. 3 is a block diagram of a system to facilitate processing of recyclable items, in accordance with some embodiments.

FIG. 3 is a block diagram of a system 300 to facilitate processing of recyclable items, in accordance with some embodiments. Further, the system 300 may include a transceiver 302 configured for receiving event data associated with a recycling process corresponding to the recyclable item from at least one sensory device. Further, the event data may include data describing the recycling process. For instance, the event data may include a description of a recyclable item that may have been recycled during the recycling process. For instance, the recyclable item may include paper based products, such as used notebooks, newspapers, cardboard boxes, plastic based products such as plastic bottles, carry bags, glass based products, including windows, and bottles, metal based products, including ferrous, and non-ferrous metal based products, and so on. Further, the event data may include an amount of the recyclable item that may have been recycled. Further, the event data may include a quality of the recyclable item. Further, the quality of the recyclable item may describe an amount of the recyclable item that may not contain contaminants and may be recyclable. For instance, if the recyclable item includes paper based products, the quality of the recyclable item may correlate to an amount of ink on the recyclable item. Further, the event data may include a description of one or more recycling processes to recycle the recyclable item. For instance, the one or more recycling processes may include sorting the recyclable item, including separating plastic based products, paper based products, and metal based products from the recyclable item, rinsing, including cleaning the recyclable item to rid contaminants, coolants, or additives. Further, the one or more recycling processes may include reclamation of the recyclable item. For instance, if the recyclable item includes plastic based products, reclamation may include feeding plastic into grinders to be flaked and cleaned, and melting flakes of plastics into corresponding individual polymers and re-formed into pellets, or chemically recycled through processes such as depolymerization, decomposition or conversion and re-formed into chemical components, monomers or petroleum products. Further, if the recyclable item includes glass based products, reclamation may include crushing the glass into small pieces (cullet). Further, the cullet may be shipped blended with virgin material, or placed in a furnace and melted to be converted directly into new glass containers. Further, if the recyclable item metal plastic based products, reclamation may include smelting the metals at high temperatures, such as 2,800 degrees Fahrenheit. Further, the molten metal liquid may be recast into ingots. Further, the event data may be received from the at least one sensory device. Further, the at least one sensory device may be configured to capture the event data associated with the recycling process. For instance, the at least one sensory device may include a spectroscopic scanner used during sorting configured to differentiate between different types of paper based products, and plastic based products. Further, the at least one sensory device may include a colored filter scanner configured to scan, and aid in sorting of glass based products. Further, in some embodiments, the event data may include sensory data captured by the at least one sensory device. Further, in some embodiments, the at least one sensory device may include a visual classification system located at a Material Recovery Facility (MRF) configured to capture an image of the recyclable item, wherein the at least one of an amount and a type of recyclable item may be determinable based on analysis of the image. Further, the at least one sensory device may include at least one scanning device configured for scanning a tag associated with a container configured to store the recyclable item. For instance, the at least one tag may include a location tag such as a GPS tag, GLONASS tag, a Bluetooth beacon, and ultra wideband tag. Further, the event data may include at least one of a location of the recyclable item, such as the location of the recyclable item while being transported to a Materials Recovery Facility (MRF), temporal details of a time at which the recyclable item is placed in the container, is transported, and a time when the recyclable item is received at the MRF. Further, the first user may include an individual, a corporation, a manufacturing facility, or a government agency associated with the recycling process of the recyclable item. Further, the transceiver 302 may be configured for receiving a request for the event data from a second user device. Further, the second user device may correspond to a second user, such as at least one of a government agency, an NGO, a corporate organization, and an individual. Further, the second user may request for the event data associated with the recycling process to evaluate and compare a recycling performance and/or practice of one or more recyclers, to draw larger conclusions about recycling trends associated with waste and/or materials management process. Further, the transceiver 302 may be configured for transmitting the event data to the second user device based on deducting of a predetermined amount of crypto tokens from a second crypto account associated with a second user of the second user device. Further, the system 300 may include a processing device 304 communicatively coupled to the transceiver 302. Further, the processing device 304 may be configured for deducting the predetermined amount of crypto tokens from the second crypto account associated with the second user device. Further, the second crypto account may include at least one of a second digital wallet associated with the second user of the second user device and a second hardware wallet associated with the second user of the second user device. Further, the processing device 304 may be configured for recording transaction data associated with the deducting the predetermined amount of crypto tokens from the second crypto account. For instance, the transaction data may include at least one of a time of deducting the second crypto token, a digital address of the second crypto account, and the predetermined amount and a value of the crypto tokens deducted from the second crypto account. Further, the system 300 may include a storage device 306 communicatively coupled to the processing device 304. Further, the storage device 306 may be configured for storing, using a distributed ledger technology, each of the tracking data, and the event data. Further, in an instance, the storage device 306 may be configured for storing the transaction data associated with the deducting of the predetermined amount of crypto tokens from the second crypto account. Further, in some embodiments, the processing device 304 may be configured for analyzing each of the tracking data, and the event data to calculate at least one of a proof of provenance data and a proof of impact data. Further, the proof of provenance data may include an origin and ownership data. Further, the at least one sensory device may calculate the proof of provenance data by analyzing the event data. For instance, the event data may include sensory data captured from at least one tag, such as a QR tag, an NFC tag, an RFID tag, a Numeric tag, a Magnetic tag, and so on, associated with a container of the recyclable item, as captured by a tag reader. Further, the processing device 304 may be configured to determine the proof provenance data based on the sensory data captured from the at least one tag. For instance, the sensory data captured by the tag reader may include an origin data describing a source of the recyclable item, and an ownership data describing an owner of the recyclable item, such as a corporation, an individual, a government agency, and so on. Further, the proof of provenance data may include recycling data corresponding to at least one of a quality of a recyclable item associated with the recycling process, a quantity of the recyclable item, and an amount of non-recyclable material associated with the recycling process. Further, the proof of impact data may include recycling data corresponding to at least one of a raw material reduction and $CO_2$ offset. Further, the processing device 304 may be configured to analyze the event data to calculate the proof of impact data. For instance, if the event data includes one or more hyperspectral images captured by one or more hyperspectral cameras, the processing device 304 may be configured for analyzing the one or more hyperspectral images, such as through image processing, and determine an amount of the recyclable item. For instance, if item comprises plastic based food packaging products, the processing device 304 may be configured to determine an amount of recyclable item not containing food particles, such as food scraps. Further, the amount of recyclable item not containing food particles may correspond to a raw material reduction. Further, the processing device 304 may be configured to analyze the event data to determine a composition of the recyclable item to calculate a carbon offset after recycling the recyclable item. For instance, recycling plastic based products, such as Polyethylene terephthalate (PET) bottles may lead to a higher carbon ($CO_2$) offset than recycling paper based products. Further, in an embodiment, the processing device 304 may be configured to analyze the event data to determine a geographic relocation of the recyclable item to calculate a carbon offset in the transportation the recyclable item. For instance, recycling item transported a within one city may lead to a higher carbon ($CO_2$) offset than recycling item transported across multiple states. Further, the proof of provenance data may be calculated by the processing device 304 by analyzing the event data. For instance, if the event data comprises one or more hyperspectral images captured by a hyperspectral camera, the processing device 304 may be configured to analyze the one or more hyperspectral images, such as through image processing, to determine a quantity of the recyclable item. Further, in an instance, the analyzing may include comparing the quantity of the recyclable item against a pre-set provenance scale. For instance, 5 tons of the recyclable item may correspond to a point on the provenance. Accordingly, in an instance, 25 tons of the recyclable item may correspond to 5 points on the provenance scale. Further, the processing device 204 may be configured for determining a quality of the recyclable item. Further, the quality of the recyclable item may be calculated by comparing the quantity of the recyclable item against an amount of contaminants in the recyclable item. For instance, the quantity of the recyclable item may be compared against the quantity of contaminants to determine a quality of the recyclable item. Further, the proof of provenance data may comprise an amount of discarded non-recyclable item. Further, the discarded non-recyclable item may have been sorted from the recyclable item during the recycling process. Further, in an instance, a quantity of the discarded non-recyclable item may be compared against the quantity of the recyclable item to determine the quality of the recyclable item.

Further, the processing device 304 may be configured for generating a predetermined amount of crypto tokens corresponding to at least one of the proof of impact data, and the proof of provenance data. Further, a value and the predetermined amount of the crypto tokens may correspond to the at least one of the proof of impact data, and the proof of provenance data. For instance, recycling event leading to higher $CO_2$ offsets may lead to generation of a higher predetermined amount of first crypto tokens.

Further, the transceiver 302 may be configured for transmitting the predetermined amount of crypto tokens to a first account associated with the first user device.

Further, in some embodiments, the processing device 304 may be configured for generating an anonymized event data based on anonymization of the event data. Further, the transceiver 302 may be configured for transmitting the anonymized event data to the second user device requesting the event data.

Figure 4:
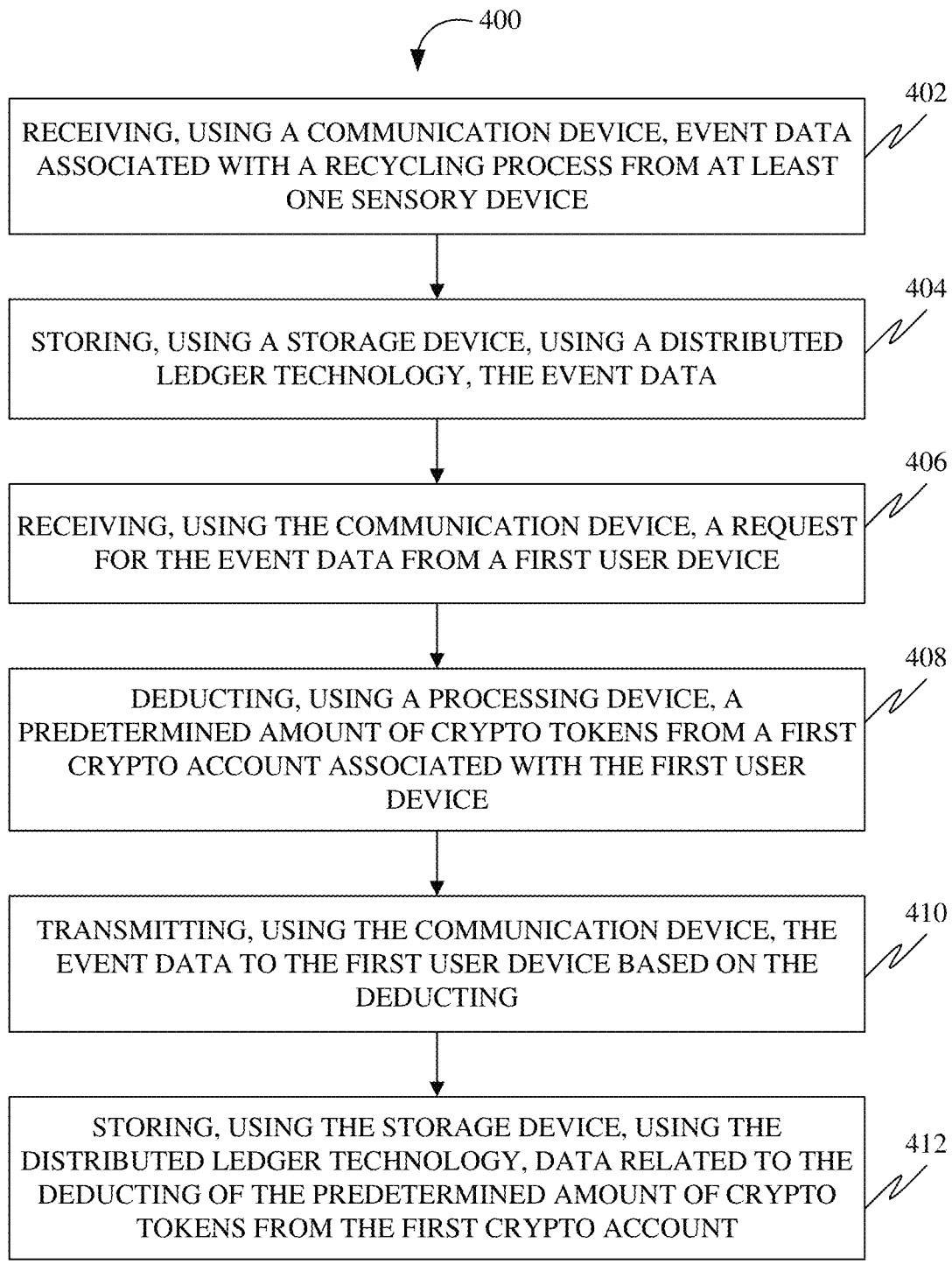
FIG. 4 is a flowchart of a method to facilitate processing of recyclable items, in accordance with some embodiments

FIG. 4 is a flowchart of a method 400 to facilitate processing of recyclable items, in accordance with some embodiments. Further, at 402, the method 400 may include receiving, using a communication device, event data associated with a recycling process from at least one sensory device.

Further, at 404, the method 400 may include storing, using a storage device, using a distributed ledger technology, the event data.

Further, at 406, the method 400 may include receiving, using the communication device, a request for the event data from a first user device.

Further, at 408, the method 400 may include deducting, using a processing device, a predetermined amount of crypto tokens from a first crypto account associated with the first user device.

Further, at 410, the method 400 may include transmitting, using the communication device, the event data to the first user device based on the deducting.

Further, at 412, the method 400 may include storing, using the storage device, using the distributed ledger technology, data related to the deducting of the predetermined amount of crypto tokens from the first crypto account.

Further, in some embodiments, the at least one sensory device may include a visual classification system configured to capture an image of a recyclable item. Further, the at least one of an amount and a type of recyclable item may be determinable based on analysis of the image.

Further, in some embodiments, the event data may include at least one of an amount and a type of recyclable item, an amount of non-recyclable item, data related to at least one recycling procedure in the recycling process, and an amount and a type of recycled item.

Further, in some embodiments, the at least one sensory device may include a hyperspectral camera located configured to capture a hyperspectral image of the recyclable item. Further, the at least one of an amount and a type of recyclable item may be determinable based on analysis of the hyperspectral image.

Further, in some embodiments, the at least one sensory device may include a tag reader configured to read at least one tag associated with a container configured to receive and store a recyclable item. For instance, the at least one tag may include a location tag, such as a GPS sensor, and a GLONASS sensor.

Further, in some embodiments, the at least one sensory device may include a spectroscopic scanner configured to determine a type of a recyclable item.

Figure 5:
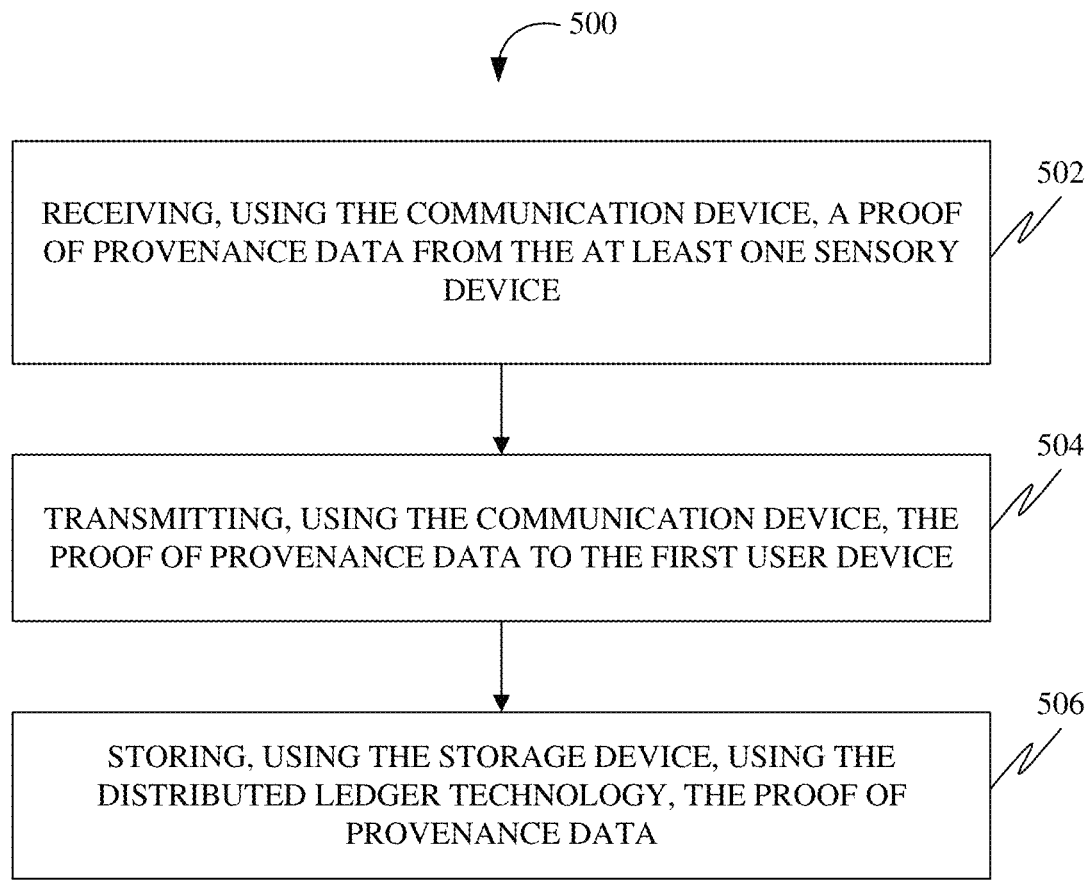
FIG. 5 is a flowchart of a method of calculating a proof of provenance data, in accordance with some embodiments.

FIG. 5 is a flowchart of a method 500 of calculating a proof of provenance data, in accordance with some embodiments.

Further, at 502, the method 500 may include receiving, using the communication device, a proof of provenance data from the at least one sensory device. Further, the at least one sensory device may be configured for calculating the proof of provenance data based on the event data. Further, the proof of provenance data may include recycling data corresponding to at least one of a quality of a recyclable item associated with the recycling process, a quantity of the recyclable item, and a quantity of non-recyclable items associated with the recycling process. Further, the proof of provenance data may include an origin and ownership data. Further, the at least one sensory device may calculate the proof of provenance data by analyzing the event data. For instance, the event data may include sensory data captured from at least one tag, such as a QR tag, an NFC tag, an RFID tag, a Numeric tag, a Magnetic tag, and so on, associated with a container of the recyclable item, as captured by a tag reader. Further, the tag reader may be configured to determine the proof provenance data based on the sensory data captured from the at least one tag. For instance, the sensory data captured by the tag reader may include an origin data describing a source of the recyclable item, and an ownership data describing an owner of the recyclable item, such as a corporation, an individual, a government agency, and so on. Further, the proof of provenance data may include a recycling data corresponding to at least one of a quality of a recyclable item associated with the recycling process, a quantity of the recyclable item, and a quantity of non-recyclable items associated with the recycling process. Further, the at least one sensory device may calculate the proof of provenance data by analyzing the event data. For instance, if the event data comprises one or more images captured by a visual classification system, such as an AI camera, the visual classification system may be configured to analyze the one or more images, such as through image processing, to determine a quantity of the recyclable item. Further, in an instance, the analyzing may include determining a quantity of the recyclable item, such as determining that the recycling process may correspond to 5 tons of the recyclable item. Further, the at least one sensory device may be configured for determining a quality of the recyclable item. Further, the quality of the recyclable item may be calculated by comparing the quantity of the recyclable item against an amount of contaminants in the recyclable item. For instance, the quantity of the recyclable item may be compared against the quantity of contaminants to determine the quality of the recyclable item. Further, the proof of provenance data may comprise an amount of discarded non-recyclable item. Further, the discarded non-recyclable item may have been sorted from the recyclable item during the recycling process. Further, in an instance, a quantity of the discarded non-recyclable item may be compared against the quantity of the recyclable item to determine the quality of the recyclable item.

Further, at 504, the method 500 may include transmitting, using the communication device, the proof of provenance data to the first user device.

Further, at 506, the method 500 may include storing, using the storage device, using the distributed ledger technology, the proof of provenance data.

Figure 6:
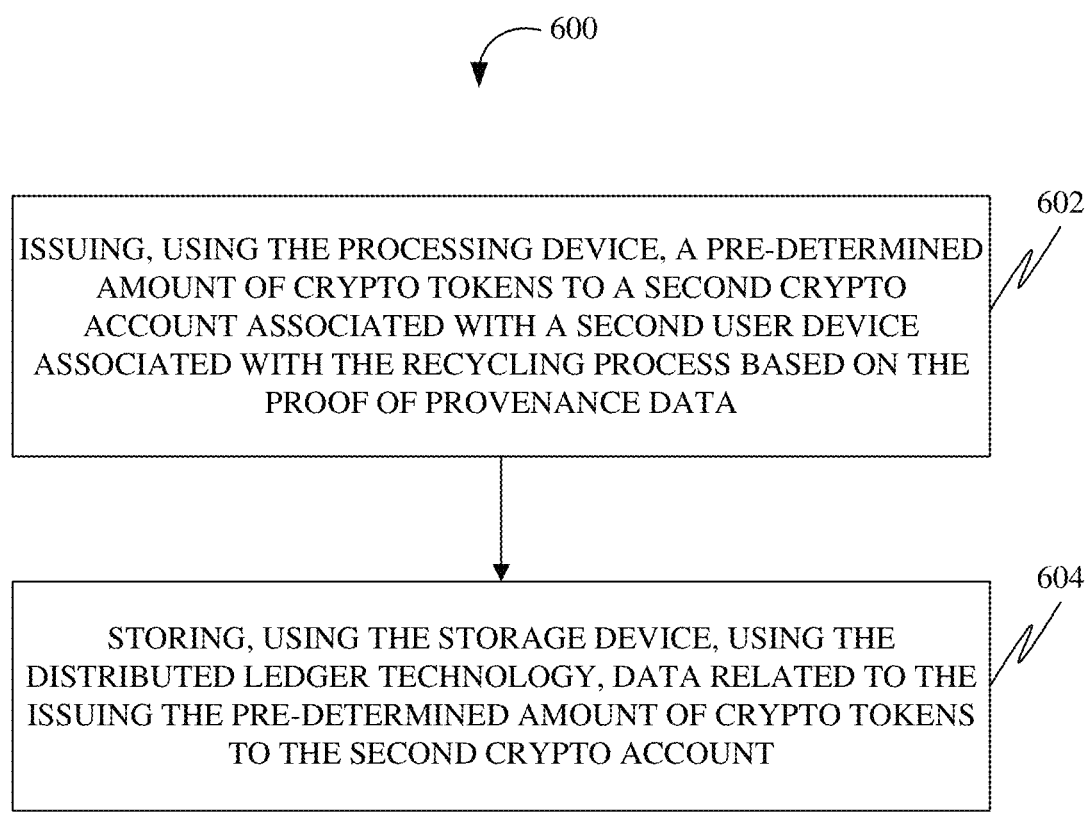
FIG. 6 is a flowchart of a method of issuing a predetermined amount of crypto tokens to a second crypto account based on proof of provenance data, in accordance with some embodiments.

FIG. 6 is a flowchart of a method 600 issuing a predetermined amount of crypto tokens based on the proof of provenance data, in accordance with some embodiments Further, at 602, the method 600 may include issuing, using the processing device, a predetermined amount of crypto tokens to a second crypto account associated with a second user device associated with the recycling process based on the proof of provenance data.

Further, at 604, the method 600 may include storing, using the storage device, using the distributed ledger technology, data related to the issuing the predetermined amount of crypto tokens to the second crypto account.

Figure 7:
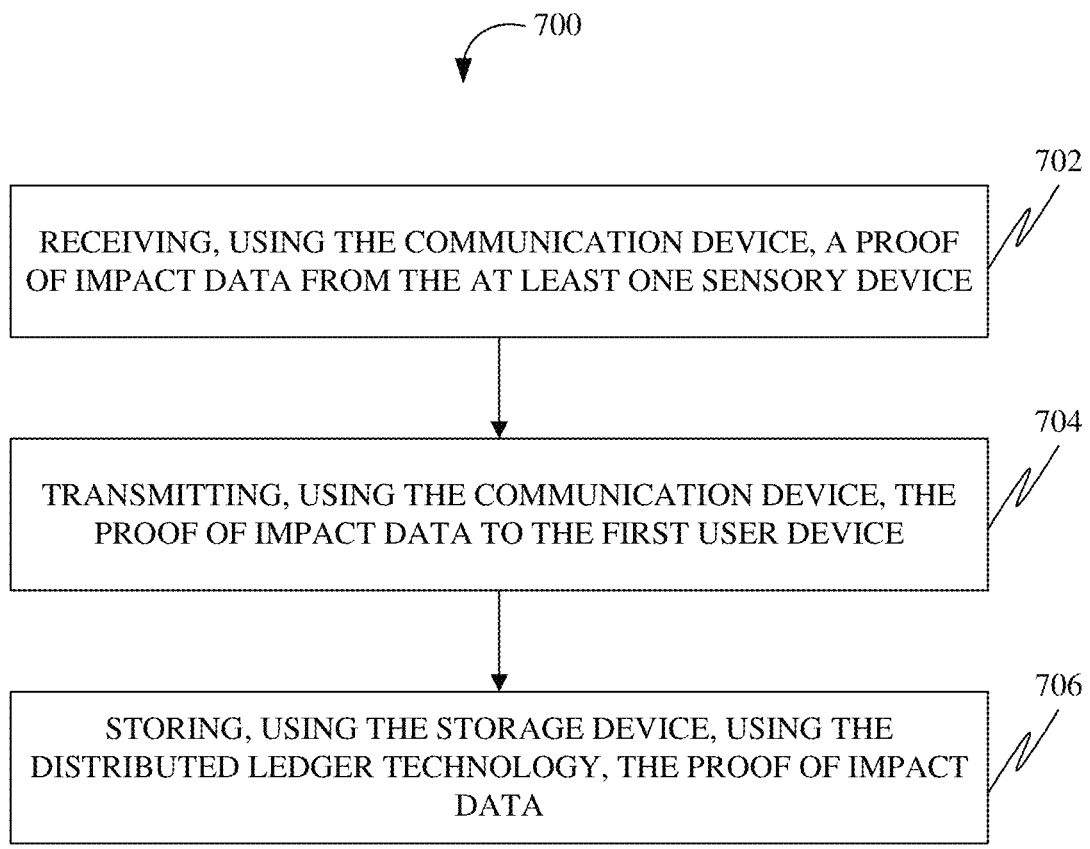
FIG. 7 is a flowchart of a method of calculating a proof of impact data, in accordance with some embodiments.

FIG. 7 is a flowchart of a method 700 of calculating a proof of impact data, in accordance with some embodiments.

Further, at 702, the method 700 may include receiving, using the communication device, a proof of impact data from the at least one sensory device. Further, the at least one sensory device may be configured for calculating the proof of impact data based on the event data. Further, the proof of impact data may include recycling data corresponding to at least one of a raw material reduction and $CO_2$ offset. Further, the proof of impact data may include recycling data corresponding to at least one of a raw material reduction and $CO_2$ offset. Further, the communication device 202 may be configured for transmitting the proof of impact data to the first user device. Further, the at least one sensory device may be configured to analyze the event data to calculate the proof of impact data. For instance, if the event data includes one or more images captured by a visual classification system, such as an X ray, the visual classification system may be configured for analyzing the one or more images, such as through image processing, and determine an amount of the recyclable item. For instance, if recyclable item comprises plastic based food packaging products, the at least one sensory device may be configured to determine an amount of recyclable item not containing food particles, such as food scraps. Further, the amount of recyclable item not containing food particles may correspond to raw material reduction. Further, the at least one sensory device may be configured to analyze the event data to determine a composition of the recyclable item to calculate a carbon offset after recycling the recyclable item. For instance, recycling plastic based products, such as Polyethylene terephthalate (PET) bottles may lead to a higher carbon ($CO_2$) offset than recycling paper based products.

Further, at 704, the method 700 may include transmitting, using the communication device, the proof of impact data to the first user device.

Further, at 706, the method 700 may include storing, using the storage device, using the distributed ledger technology, the proof of impact data.

Figure 8:
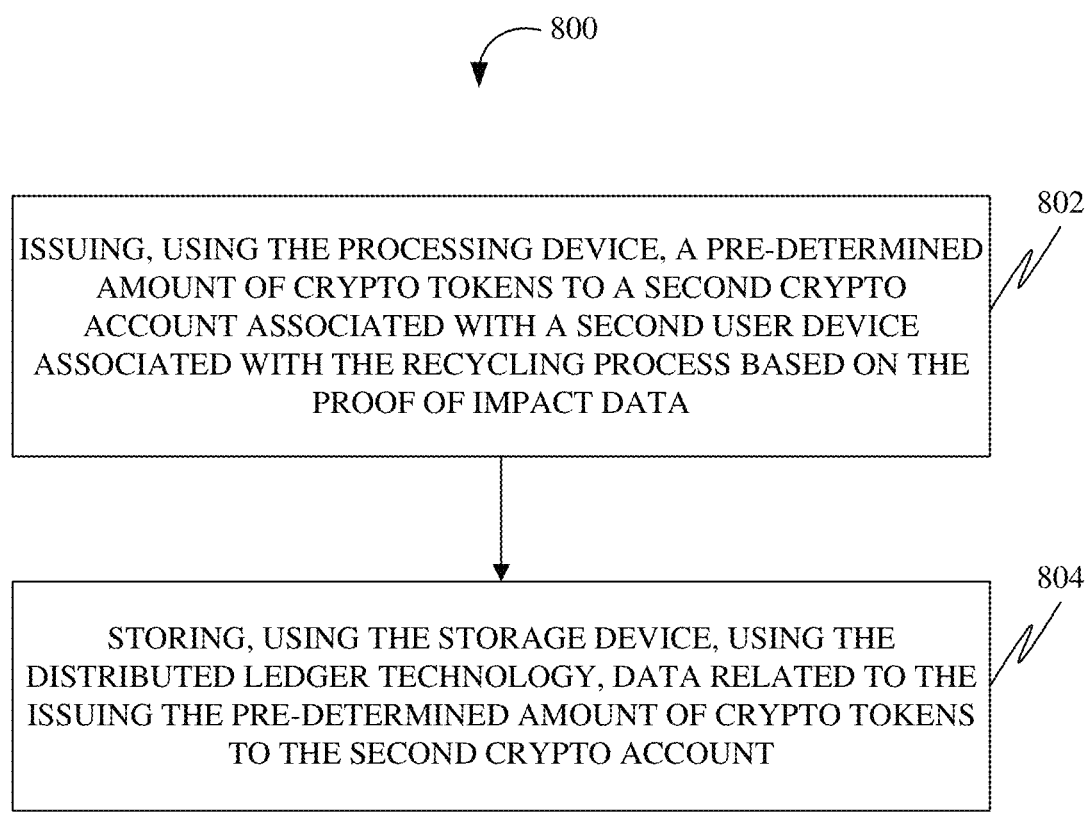
FIG. 8 is a flowchart of a method of issuing a predetermined amount of crypto tokens to a second crypto account based on proof of impact data, in accordance with some embodiments.

FIG. 8 is a flowchart of a method 800 for issuing a predetermined amount of crypto tokens based on the proof of impact data, in accordance with some embodiments Further, at 802, the method 800 may include issuing, using the processing device, a predetermined amount of crypto tokens to a second crypto account associated with a second user device associated with the recycling process based on the proof of impact data.

Further, at 804, the method 800 may include storing, using the storage device, using the distributed ledger technology, data related to the issuing the predetermined amount of crypto tokens to the second crypto account.

Figure 9:
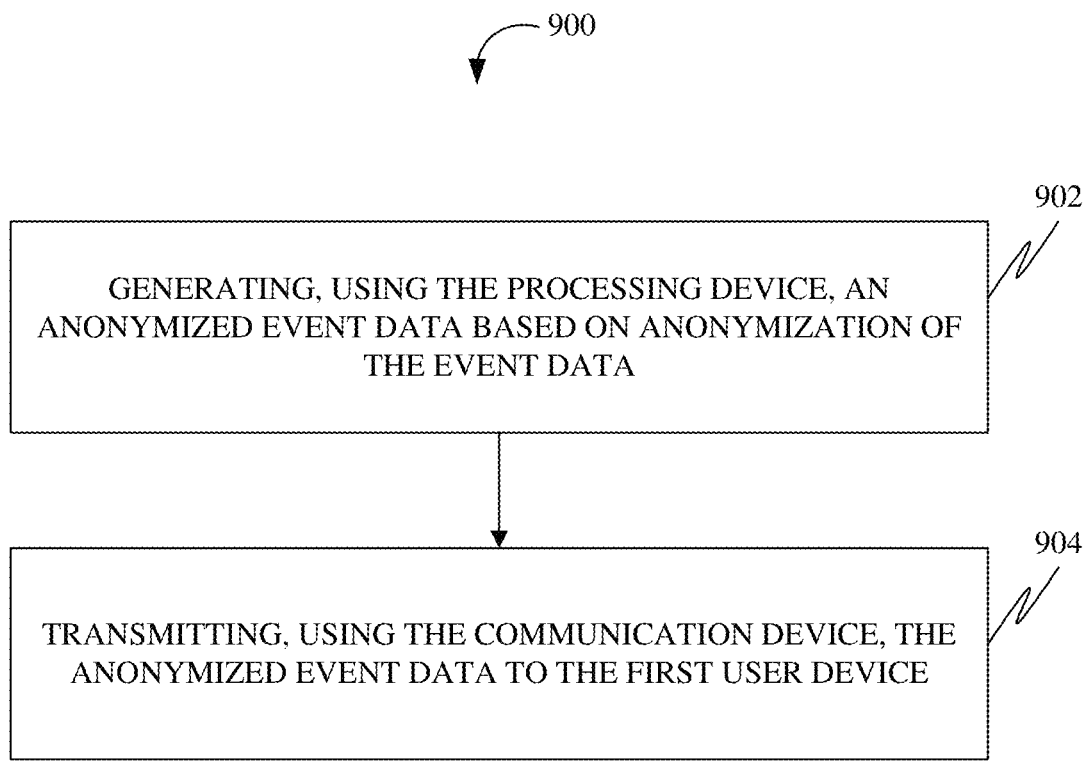
FIG. 9 is a flowchart of a method to facilitate generation of anonymized event data, in accordance with some embodiments.

FIG. 9 is a flowchart of a method 900 to facilitate generation of anonymized event data, in accordance with some embodiments.

Further, at 902, the method 900 may include generating, using the processing device, an anonymized event data based on anonymization of the event data.

Further, at 904, the method 900 may include transmitting, using the communication device, the anonymized event data to the first user device.

Figure 10:
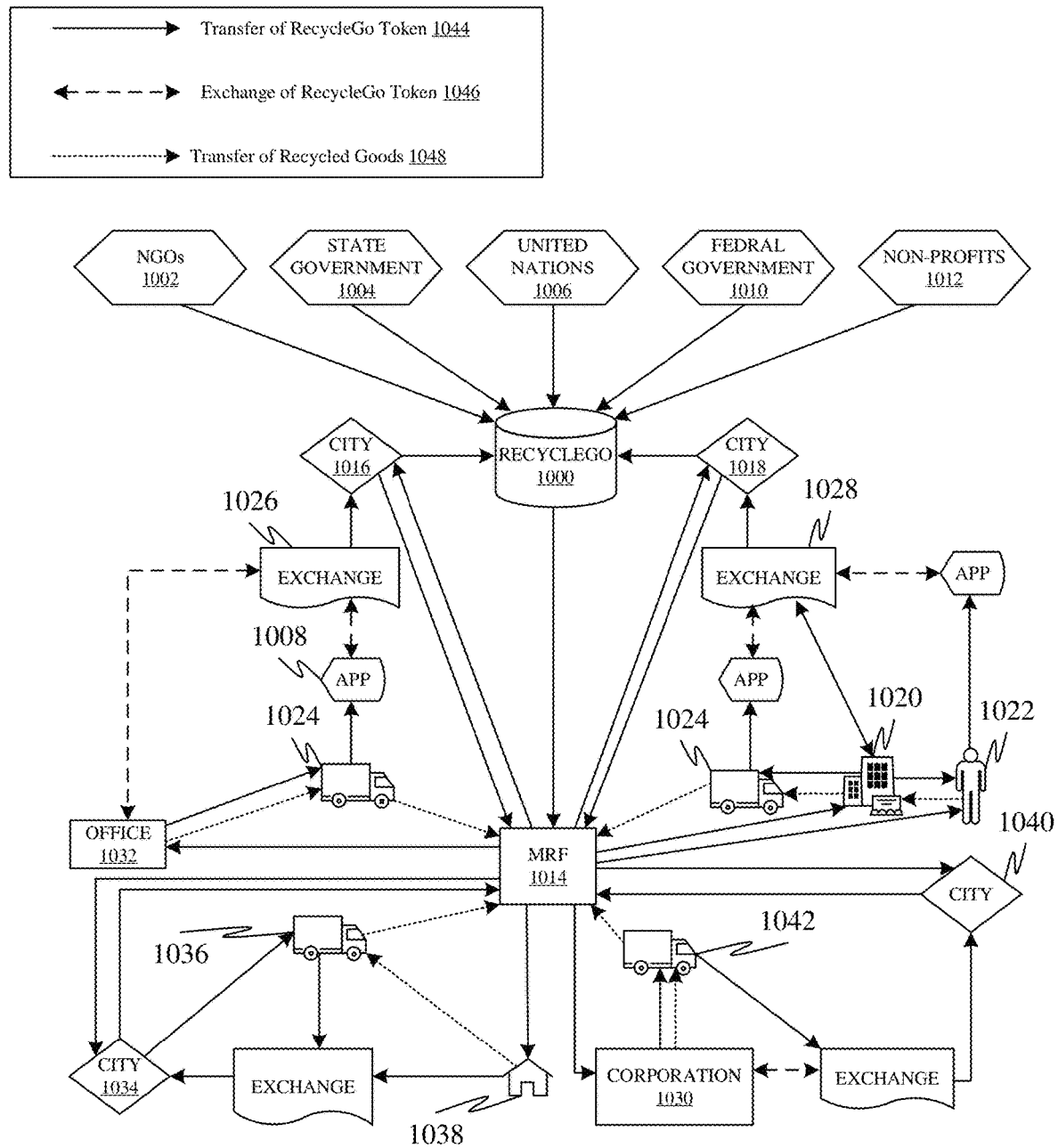
FIG. 10 is a block diagram of a system to facilitate processing of recyclable items in communication with a plurality of participants, in accordance with some embodiments.

FIG. 10 is a block diagram of a system to facilitate processing of recyclable items in communication with a plurality of participants, in accordance with some embodiments. Further, transfer of RecycleGO tokens 1044 is indicated by solid arrows, exchange of RecycleGO tokens 1046 is indicated with double sided dashed arrows, and transfer of recycled goods 1048 is indicated with dotted arrows. Donations, subsidies, and grants from NGOs 1002, state governments 1004, United Nations 1006, federal government 1010, and non-profits 1012 may flow into RecycleGO 1000 and may either be distributed based on request parameters or added to a fund for environmental initiatives, named as World Sustainability Fund (WSF). Further, RecycleGO tokens may be issued ("minted") by RecycleGO through Proof-of-Impact during the recycling process and may be distributed through Material Recovery Facility (MRF) 1014 to participants based on performance. Further, cities, such as city 1016, and city 1018 may distribute waste/recycle budget funding through MRF 1014 to participants. Further, RecycleGO 1000 may distribute RecycleGO tokens through the MRF 1014 to residential buildings 1020 based on performance. Further, residents 1022, and RecycleGO truck drivers 1024 may sell RecycleGO tokens to exchanges, such as exchange 1026, and exchange 1028 for cash of commensurate value through a mobile application 1008. Further, transportation services, including RecycleGO truck drivers 1024 may get paid in RecycleGO tokens by corporation 1030, office 1032, and residential building 1020, which may also serve as data points to collect recyclable raw material. Further, city 1014, and city 1016 may buy RecycleGO tokens from the exchange 1026, and exchange 1028 respectively. Further, RecycleGO 1000 may distribute RecycleGO tokens through the MRF 1014 to the office 1032 based on performance. Further, the residential building 1020 may distribute additional RecycleGO tokens to tenants, such as the residents 1022 to encourage recycling. Further, cities, and such as the city 1034, and corporations, such as the corporation 1030 may distribute RecycleGO tokens directly to transportation vehicles, such as a transportation vehicle 1036, and transportation vehicle 1042 for pickup and delivery of recycled goods. Further, cities, such as the city 1016, and the city 1018 may subsidize RecycleGO 1000 ecosystem. Further, RecycleGO 1000 may distribute tokens through the MRF 1014 to households, such as the household 1038 based on performance. RecycleGO 1000 may distribute RecycleGO tokens through the MRF 1014 to corporations, such as the corporation 1030 based on performance. Further, RecycleGO may distribute rebates through the MRF 1014 to cities, such as city 1034 and city 1040 based on performance. Further, the residential building 1020 may buy RecycleGO tokens to schedule pickups, but may also sell tokens to turn profit with high recycling performance, and collection of dividends from data sales leading to increase in value in RecycleGO tokens. Further, mobile application may interface with exchanges to enable easy purchase or sale of tokens or review of wallets by participants, such as the corporation 1030, household 1038, and city 1014.

Figure 11:
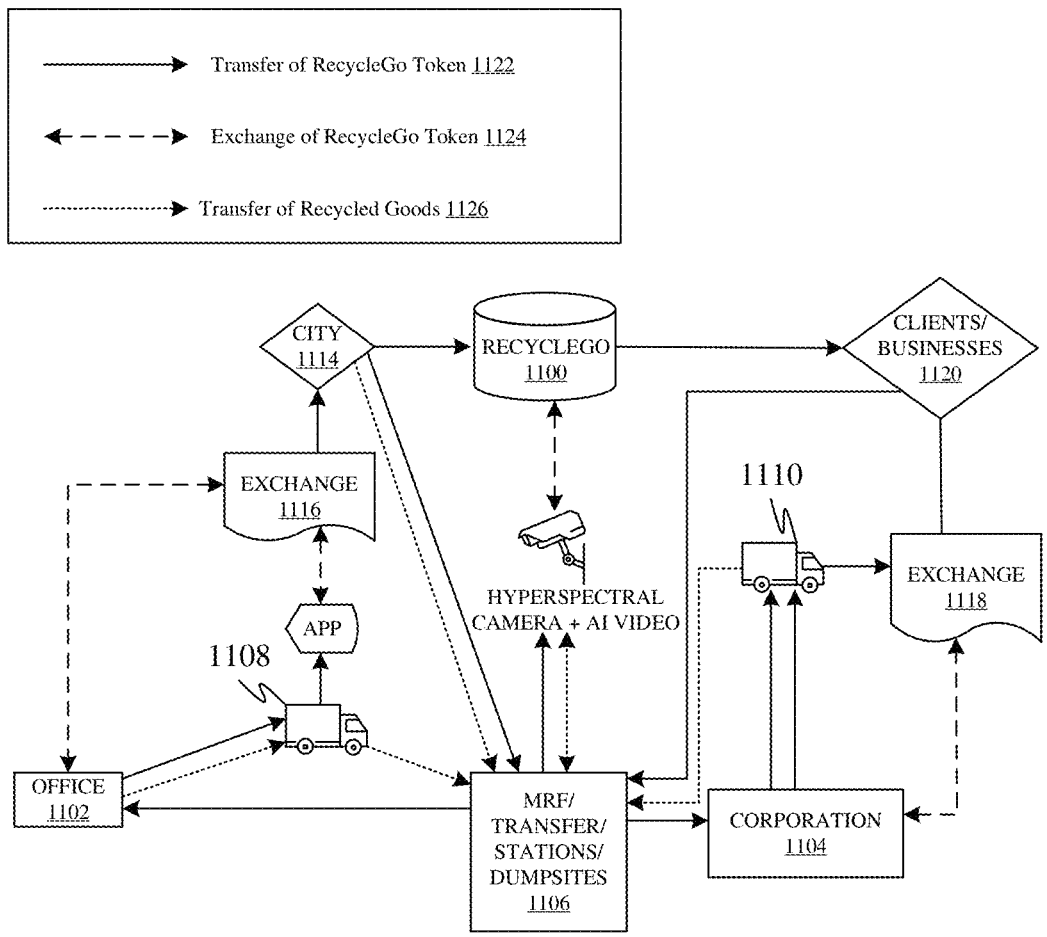
FIG. 11 is a block diagram of a system to facilitate processing of recyclable items allowing a business to purchase event data related to a recycling process, in accordance with some embodiments.

FIG. 11 is a block diagram of a system to facilitate processing of recyclable items allowing a business to purchase event data related to a recycling process, in accordance with some embodiments. Further, transfer of RecycleGO tokens 1122 is indicated with solid arrows, exchange of RecycleGO tokens 1124 is indicated by double sided dashed arrows, and transfer of recycled goods 1126 is indicated by dotted arrows. Participants, such as office 1102, city 1114, and corporation 1104 may transfer recyclable raw material to Material Recovery Facility (MRF) 1106 through transport vehicles, such as transport vehicle 1108, and transport vehicle 1110. Tracking data received as event data and stored in the system (RecycleGO 1100) may be integrated into the transportation of this material. Further, hyperspectral cameras 1112 at the MRF 1106 may record the recycling process, which may be stored and analyzed by the RecycleGO 1100. Further, RecycleGO tokens issued ("minted") by RecycleGO 1100 through Proof-of-Impact may be distributed through the MRF 1106 to participants, including the city 1114, office 1102, and corporation 1104 based on performance. Further, participants, such as the office 1102, the city 1114, and the corporation 1104 may sell RecycleGO tokens to exchanges, such as exchange 1116, and exchange 1118 for cash of commensurate value through a mobile application. Further, transportation services, including RecycleGO truck drivers corresponding to the transport vehicle 1108, and the transport vehicle 1110 may get paid in RecycleGO tokens by the participants. Further, clients 1120 may purchase the event data from RecycleGO 1100 in exchange for RecycleGO tokens.

Figure 12:
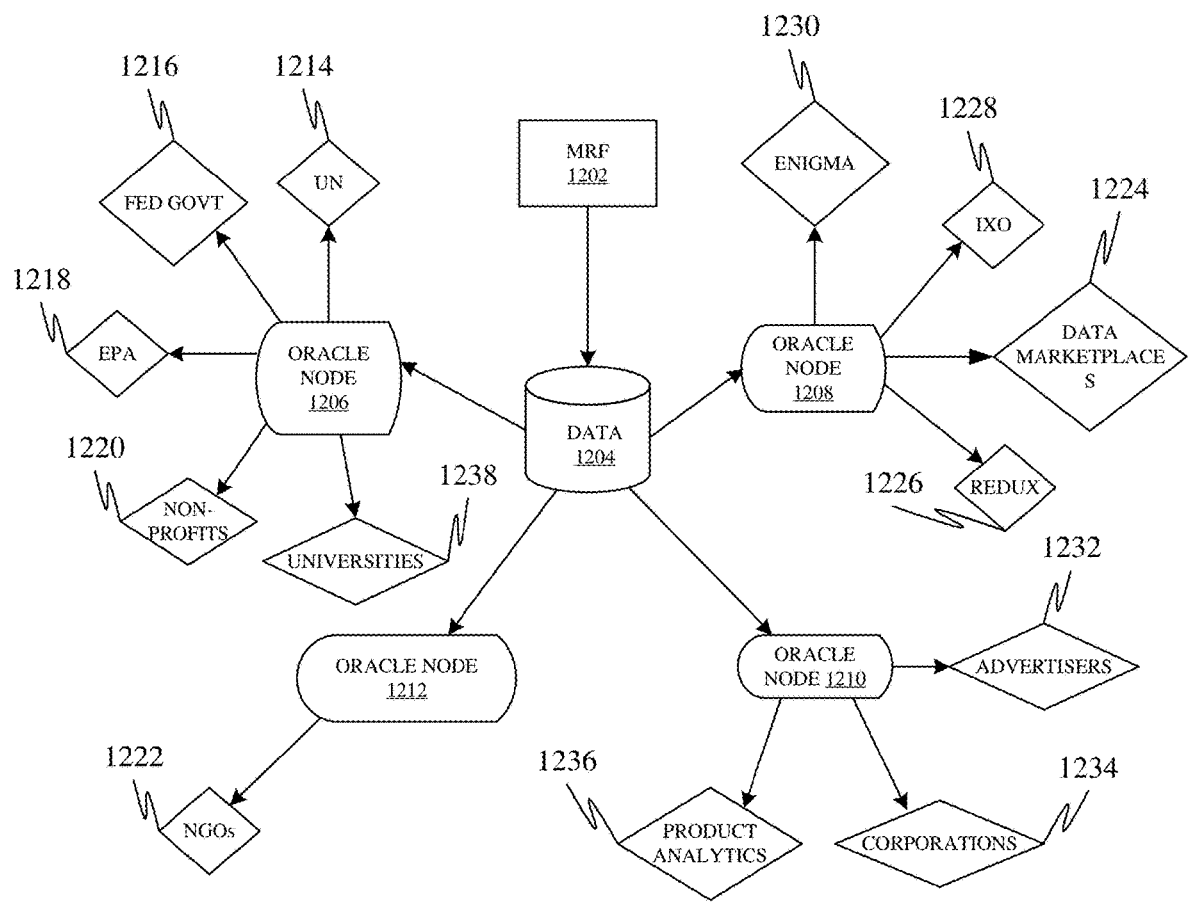
FIG. 12 is a block diagram of a system to facilitate processing of recyclable items allowing participating entities to purchase event data related to a recycling process, in accordance with some embodiments.

FIG. 12 is a block diagram of a system to facilitate processing of recyclable items allowing participating entities to purchase event data related to a recycling process, in accordance with some embodiments. Further, event data captured in Material Recovery Facilities (MRFs), such as an MRF 1202 may be stored in a storage device such as database 1204. Further, the event data may be transmitted to a plurality of oracle nodes, such as the oracle node 1206, oracle node 1208, oracle node 1210, and oracle node 1212, and transmitted to participating entities such as United Nations 1214, Federal government 1216, EPA 1218, Non-profits 1220, NGOs 1222, data marketplaces 1224, such as IXO 1228, Enigma 1230, Redux 1226, advertisers 1232, corporations 1234, product analytics firms 1236, and universities 1238.

Figure 13:
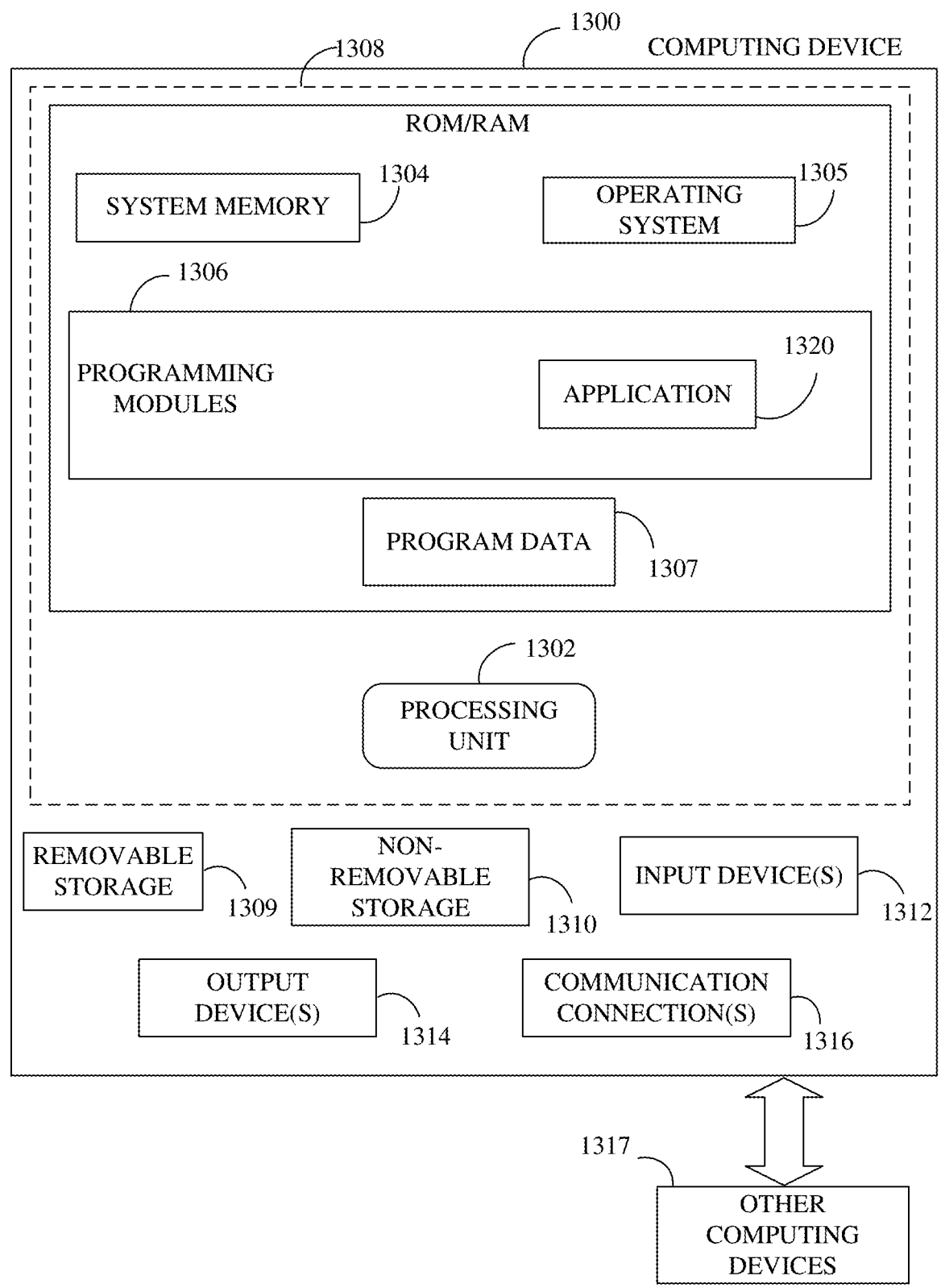
FIG. 13 is a block diagram of a computing device for implementing the methods disclosed herein, in accordance with some embodiments.

With reference to FIG. 13, a system consistent with an embodiment of the disclosure may include a computing device or cloud service, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random-access memory (RAM)), non-volatile (e.g. read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include image-processing module, machine learning module. Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and non-volatile, removable and non-removable media implemented in any method or technology for storage of information, such as computer-readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, a location sensor, a camera, a biometric sensor, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media.

Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., application 1320 such as a media player) may perform processes including, for example, one or more stages of methods, algorithms, systems, applications, servers, databases as described above. The aforementioned process is an example, and processing unit 1302 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

We claim:

1. A system to facilitate processing of recyclable items, the system comprising:
   a tag reader configured for capturing sensory data from at least one tag associated with a container of at least one recyclable item, wherein the sensory data comprises an origin data describing a source of the at least one recyclable item and an ownership data describing an owner of the at least one recyclable item;
   a communication device configured for receiving event data associated with a recycling process from at least one sensory device, wherein the at least one sensory device is configured for capturing the event data associated with the recycling process, wherein the at least one sensory device comprises a hyperspectral camera, wherein the hyperspectral camera is configured for capturing at least one hyperspectral image of the at least one recyclable item undergoing the recycling process, wherein the event data comprises the at least one hyperspectral image, an amount of recyclable items in the at least one recyclable item, and at least one of an amount of non-recyclable items and an amount of contaminant in the at least one recyclable item;

a processing device communicatively coupled to the communication device and the tag reader, wherein the processing device is configured for:

analyzing the event data using at least one image processing model;

determining a quality of the at least one recyclable item by comparing at least one of the amount of non-recyclable items and the amount of contaminant against the amount of recyclable items;

determining a composition of the at least one recyclable item based on the analyzing of the event data;

calculating a carbon offset for recycling the at least one recyclable item based on the composition of the at least one recyclable item;

generating a predetermined amount of crypto tokens based on the carbon offset and the quality, wherein the predetermined amount of crypto tokens corresponds to the carbon offset and the quality; and issuing the predetermined amount of crypto tokens to a second crypto account associated with a second user device based on the generating and the sensory data;

a storage device communicatively coupled to the processing device, wherein the storage device is configured for storing, using a distributed ledger, the event data, and data related to the issuing of the predetermined amount of crypto tokens to the second crypto account.

2. The system of claim 1, wherein the communication device is further configured for:

receiving a request for the event data from a first user device; and transmitting the event data to the first user device based on deducting the predetermined amount of crypto tokens from a first crypto account associated with the first user device, wherein the processing device is further configured for the deducting of the predetermined amount of crypto tokens from the first crypto account associated with the first device.

3. The system of claim 1, wherein the communication device is further configured for:

receiving a proof of provenance data from the at least one sensory device, wherein the proof of provenance data comprises recycling data; and transmitting the proof of provenance data to a first user device, wherein the storage device is further configured for storing, using the distributed ledger, the proof of provenance data.

4. The system of claim 3, wherein the issuing of the predetermined amount of crypto tokens to the second crypto account associated with the second user device associated with the recycling process is further based on the proof of provenance data.

5. The system of claim 1, wherein the communication device is further configured for:

receiving a proof of impact data from the at least one sensory device, wherein the proof of impact data comprises recycling data corresponding to a raw material reduction; and transmitting the proof of impact data to a first user device, wherein the storage device is further configured for storing, using the distributed ledger, the proof of impact data.

6. The system of claim 5, wherein the issuing of the predetermined amount of crypto tokens to the second crypto account associated with the second user device associated with the recycling process is further based on the proof of impact data.

7. A method to facilitate processing of recyclable items is disclosed, the method comprising:

capturing, using a tag reader, sensory data from at least one tag associated with a container of at least one recyclable item, wherein the sensory data comprises an origin data describing a source of the at least one recyclable item and an ownership data describing an owner of the at least one recyclable item;

receiving, using a communication device, event data associated with a recycling process from at least one sensory device, wherein the at least one sensory device is configured for capturing the event data associated with the recycling process, wherein the at least one sensory device comprises a hyperspectral camera, wherein the hyperspectral camera is configured for capturing at least one hyperspectral image of at least one recyclable item undergoing the recycling process, wherein the event data comprises the at least one hyperspectral image, an amount of recyclable items in the at least one recyclable item, and at least one of an amount of non-recyclable items and an amount of contaminant in the at least one recyclable item;

analyzing, using a processing device, the event data using at least one image processing model;

determining, using the processing device, a quality of the at least one recyclable item by comparing at least one of the amount of non-recyclable items and the amount of contaminant against the amount of recyclable items;

determining, using the processing device, a composition of the at least one recyclable item based on the analyzing of the event data;

calculating, using the processing device, a carbon offset for recycling the at least one recyclable item based on the composition of the at least one recyclable item;

generating, using the processing device, a predetermined amount of crypto tokens based on the carbon offset and the quality, wherein the predetermined amount of crypto tokens corresponds to the carbon offset and the quality;

issuing, using the processing device, the predetermined amount of crypto tokens to a second crypto account associated with a second user device based on the generating and the sensory data; and storing, using a storage device, using a distributed ledger, the event data and data related to the issuing of the predetermined amount of crypto tokens to the second crypto account.

8. The method of claim 7 further comprising:

receiving, using the communication device, a request for the event data from a first user device; and deducting, using the processing device, the predetermined amount of crypto tokens from a first crypto account associated with the first device; and transmitting, using the communication device, the event data to the first user device based on the deducting of the predetermined amount of crypto tokens from the first crypto account associated with the first user.

9. The method of claim 7, further comprising:
receiving, using the communication device, a proof of provenance data from the at least one sensory device, wherein the proof of provenance data comprises recycling data;
transmitting, using the communication device, the proof of provenance data to a first user device; and
storing, using the storage device, using the distributed ledger, the proof of provenance data.

10. The method of claim 9, wherein the issuing of the predetermined amount of crypto tokens to the second crypto account associated with the second user device associated with the recycling process is further based on the proof of provenance data.

11. The method of claim 7, further comprising:
receiving, using the communication device, a proof of impact data from the at least one sensory device, wherein the proof of impact data comprises recycling data corresponding to a raw material reduction;
transmitting, using the communication device, the proof of impact data to a first user device; and
storing, using the storage device, using the distributed ledger, the proof of impact data.

12. The method of claim 11, wherein the issuing of the predetermined amount of crypto tokens to the second crypto account associated with the second user device associated with the recycling process is further based on the proof of impact data.

* * * * *